US012768125B2

(12) United States Patent
Guo et al.

(10) Patent No.: US 12,768,125 B2
(45) Date of Patent: Oct. 20, 2026

(54) DETECTION DEVICE AND METHOD FOR DETECTING QUALITY OF ULTRA-LONG PILE FOUNDATION OF DEEP FOUNDATION PIT SUPPORT STRUCTURE

(71) Applicants: CHINA RAILWAY FOURTH ENGINEERING GROUP CO., LTD, Anhui (CN); CHINA RAILWAY FOURTH ENGINEERING GROUP CONSTRUCTION ENGINEERING CO., LTD, Anhui (CN); HEFEI POLYTECHNIC UNIVERSITY, Anhui (CN)

(72) Inventors: Leilei Guo, Hefei (CN); Zaixing Xu, Hefei (CN); Ruixue Cao, Hefei (CN); Yihan Bai, Hefei (CN); Yixian Wang, Hefei (CN); Bao Xu, Hefei (CN); Panpan Guo, Hefei (CN); Manrong Song, Hefei (CN); Guiyou Zhang, Hefei (CN); Jiahong Wang, Hefei (CN); Yuan Gao, Hefei (CN); Yongli Liu, Hefei (CN); Jinghui Hu, Hefei (CN); Xuelong Peng, Hefei (CN)

( * ) Notice: Subject to any disclaimer, the term of this patent is extended or adjusted under 35 U.S.C. 154(b) by 447 days.

(21) Appl. No.: 18/281,177

(22) PCT Filed: Jul. 6, 2023

(86) PCT No.: PCT/CN2023/106001

§ 371 (c)(1),
(2) Date: Sep. 8, 2023

(87) PCT Pub. No.: WO2025/000582

PCT Pub. Date: Jan. 2, 2025

(65) Prior Publication Data

US 2025/0257546 A1 Aug. 14, 2025

(30) Foreign Application Priority Data

Jun. 29, 2023 (CN) ........................ 202310797670.X

(51) Int. Cl.
*E02D 33/00* (2006.01)
*G01N 29/04* (2006.01)

(52) U.S. Cl.
CPC ........... *E02D 33/00* (2013.01); *G01N 29/043* (2013.01); *G01N 2291/048* (2013.01)

(58) Field of Classification Search
CPC .................. E02D 33/00; G01N 29/043; G01N 2291/048; G01N 2291/0232; G01N 2291/105
See application file for complete search history.

(56) References Cited

U.S. PATENT DOCUMENTS

2019/0293607 A1* 9/2019 Amir .................... G01N 29/343

FOREIGN PATENT DOCUMENTS

CN 108166543 A * 6/2018 ............. E02D 33/00
CN 111693605 A * 9/2020 ............. G01N 29/07

(Continued)

*Primary Examiner* — Francis C Gray
(74) *Attorney, Agent, or Firm* — Birchwood IP

(57) ABSTRACT

A detection device for detecting a quality of ultra-long pile foundation of deep foundation pit support structure is provided, and includes a plurality of sound detection pipes which are parallel to each other and are vertically arranged on a reinforcement cage of a pile foundation. The plurality of sound detection pipes are paired, two sound detection pipes in each pair of the plurality of sound detection pipes are arranged opposite to each other, and ends of the plurality of sound detection pipes are connected to each other through connecting brackets; and a sound wave transmitter and a sound wave transducer are respectively arranged in the two sound detection pipes and are connected with the sound (Continued)

wave detector arranged outside the pile foundation through cables.

14 Claims, 5 Drawing Sheets

(56) References Cited

FOREIGN PATENT DOCUMENTS

| | | | | | |
|---|---|---|---|---|---|
| CN | 110031553 B | * | 7/2021 | ............ | G01N 29/07 |
| CN | 215574851 U | * | 1/2022 | | |

* cited by examiner

DETECTION DEVICE AND METHOD FOR DETECTING QUALITY OF ULTRA-LONG PILE FOUNDATION OF DEEP FOUNDATION PIT SUPPORT STRUCTURE

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CN2023/106001 filed on Jul. 6, 2023, and which in turn claims priority under 35 USC 119 to Chinese Patent Application No. 202310797670.X filed on Jun. 29, 2023, the disclosure of which is incorporated by reference herein in its entirety as part of the present application.

TECHNICAL FIELD

The present disclosure relates to the field of quality detection of pile foundation in the civil engineering, in particular to a device and method for detecting a quality of ultra-long pile foundation of deep foundation pit support structure.

BACKGROUND

The pile foundation as a deep foundation structure has been widely used in the field of civil engineering. The pile foundation can transfer the weight and load of the super structure to the stable soil layer in contact with the pile foundation, thus greatly reducing the settlement of the foundation and the uneven settlement of the building. The pile foundation has the advantages of high bearing capacity, small settlement and strong earthquake resistance. It has been widely used in some areas with complex geological conditions, soft soil and many earthquakes, and has achieved considerable results. The pile foundation can be divided into cast-in-place pile and precast pile according to the manufacturing technology, in which cast-in-place pile is widely used, such as bridges, highways, railways, high-rise buildings and other projects. However, in the process of pile foundation construction, due to the influence of construction technology, personnel operation, outer boundary conditions and material quality, it is easy to have defects such as broken pile, neck enlargement, diameter reduction, segregation, mud inclusion, sediment and cavity. These defects are the potential hidden dangers of the building, which greatly affect the quality of the building. Once the quality of the superstructure cannot be loaded by the defects, the building will collapse and the loss will be extremely serious. Therefore, pile foundation detection is particularly important. Thus, timely detection of missing and sinking piles and effective prevention measures can greatly improve the quality of buildings. At present, the existing method for detecting a quality of pile foundation includes a static load test, a core drilling, a low strain integrity testing, a high strain dynamic testing, a self-balancing method and a sound wave transmission method. The principle of ultrasound wave transmission method to detect concrete quality is to embed several sound detection pipes in the pile in advance as the channels for ultrasonic receiving and transmitting transducers. During detection, a transmitting probe for transmitting ultrasonic waves is put in one tube and a receiving probe for receiving ultrasonic waves is put in the other tube. The two probes are lifted synchronously from the bottom up, and the instrument records the sound characteristics of ultrasonic wave propagation in the concrete measurement surface composed of two pipes. According to the arrival time, amplitude, frequency change and waveform distortion degree of the wave, the quality of concrete, the nature, size and spatial position of defects and the homogeneity of concrete are determined through analysis and processing.

However, there are some problems in the existing process of using sound wave transmission method. For example, when sound detection pipes are embedded, it is necessary to ensure that several sound detection pipes are parallel, if not, the accuracy of the final test results will be affected. Moreover, in some existing methods of strengthening sound detection pipes, brackets are placed between several sound detection pipes to ensure the stability of sound detection pipes. However, since the propagation speed of sound waves in concrete is different from that in the brackets used for reinforcement, it will also lead to inaccurate final results, which will further affect the judgment of pile integrity.

SUMMARY

The present disclosure aims at providing a detection device and method for detecting a quality of ultra-long pile foundation of deep foundation pit support structure, to solve the problems in the background and improve the accuracy of quality detection of pile foundation.

In order to solve the technical problems, the present disclosure adopts the following technical scheme.

The present disclosure provides a detection device for detecting a quality of ultra-long pile foundation of deep foundation pit support structure, which includes a plurality of sound detection pipes which are parallel to each other and are vertically arranged on a reinforcement cage of a pile foundation, wherein the plurality of sound detection pipes are paired, two sound detection pipes in each pair of the plurality of sound detection pipes are arranged opposite to each other, and ends of the plurality of sound detection pipes are connected to each other through connecting brackets; and a sound wave transmitter and a sound wave transducer are respectively arranged in the two sound detection pipes arranged opposite to each other and are connected with a sound wave detector arranged outside the pile foundation through cables.

Further, each sound detection pipe is formed by sequentially connecting a plurality of sound detection pipe sections, and a joint between adjacent sound detection pipe sections is wrapped and fixed by a sleeve.

Further, the connecting brackets each are provided with a plurality of sealing covers which are matched with ends of the sound detection pipes.

Further, the sound wave transmitter and the sound wave transducer each are sleeved by a collar which is in sliding fit with an inner wall of a corresponding sound detection pipe.

Further two limit sliding protrusions are symmetrically formed on the inner wall of each sound detection pipe, and two limit grooves which are respectively matched with the two limit sliding protrusions are symmetrically formed on an outer wall of a corresponding collar.

In addition, the present disclosure also provides a method for detecting a quality of ultra-long pile foundation of deep foundation pit support structure, adopting the above detection device, including the following steps:

S1, before construction, cleaning a construction site of a pile foundation, leveling the construction site of the pile foundation, compacting the construction site of the pile foundation, and allocating the construction site to scientifically plan a mud pit, a reinforcement cage and a storage area of construction machinery in detail;

S2, laying out a pile position with a total station, then burying a steel liner which meets requirements of rigidity and strength, filling an outside of the steel liner with clay and compacting the clay;

S3, drilling, using a drilling rig, holes on the ground, and when a depth of each drilled hole reaches a designed hole depth, a hole position, a hole diameter, a hole depth and an inclination of the drilled hole are measured to ensure that specification requirements are met, and then cleaning the holes;

S4, manufacturing the reinforcement cage, and placing four sound detection pipes in the reinforcement cage, wherein distances between adjacent sound detection pipes of the four sound detection pipes are equal;

S5, lowering the reinforcement cage into the pre-dug pile foundation, and during the lowering of the reinforcement cage the reinforcement cage is maintained in a vertical state to avoid the reinforcement cage from tilting;

S6, pouring a concrete and waiting for the concrete to solidify; and.

S7, after the concrete is solidified for a plurality of days, erecting the sound wave detector outside the pile foundation, placing the sound wave transmitter and the sound wave transducer in pre-placed sound detection pipes to start a detection, and determining an integrity of a pile body according to parameters of received sound waves.

Further, in the step S4, when placing the four sound detection pipes, the four sound detection pipes are arranged adjacent to and tangent to corresponding vertical steel bars of the reinforcement cage, and the four sound detection pipes are connected to the corresponding vertical steel bars by steel hoops at intervals of 1 meter along a length direction of each sound detection pipe.

Further, in the step S4, after the four sound detection pipes are placed, bottom openings of the four sound detection pipes are sealed by a plurality of sealing covers of a cross bracket; then lowering the reinforcement cage into the pre-dug pile foundation, wherein when the placing reinforcement cage, it is necessary to pay attention to maintaining the reinforcement cage in a vertical state to avoid the reinforcement cage from tilting; then filling all the sound detection pipes with water, and sealing top openings of the four sound detection pipes are sealed by sealing covers of the connecting brackets.

Further, in the step S4, a number of sound detection pipes is determined according to a pile diameter, when the pile diameter is less than or equal to 800 mm, the number of sound detection pipes is no less than two; when the pile diameter is between 800 mm and 1600 mm, the number of sound detection pipes is no less than three; and when the pile diameter is greater than 1600 mm, the number of sound detection pipes is no less than four.

Further, in the step S7, before starting the detection, the connecting brackets at the tops of a plurality of sound detection pipes are removed.

Compared with the prior art, the present disclosure has the following beneficial technical effects.

In the detection device for detecting a quality of ultra-long pile foundation of deep foundation pit support structure of the present disclosure, the limit sliding protrusions inside the sound detection pipes are matched with the limit grooves of collars sleeving the sound wave transmitter and the sound wave transducer, so that the sound wave transmitter and the sound wave transducer are always kept at the center positions of the corresponding sound detection pipes when the sound detection pipes are lifted, thereby the measurement accuracy is higher and the judgment of the integrity result of the pile foundation is more accurate.

In addition, in the method for detecting a quality of ultra-long pile foundation of deep foundation pit support structure of the present disclosure, the sound detection pipes are placed between two adjacent vertical steel bars and tangent to the two steel bars, and the bottoms and tops of the four sound detection pipes are hermetically connected by the sealing covers of the cross brackets, so that the four sound detection pipes can be kept parallel to each other, thereby the parameters of sound waves obtained during sound wave measurement are more accurate, and the judgment of the integrity of the pile body is more accurate.

BRIEF DESCRIPTION OF THE DRAWINGS

The present disclosure will be further described with reference to the accompanying drawings.

REFERENCE NUMERALS

1, sound wave detector; 2, cable; 3, sound detection pipe; 301, limit sliding protrusion; 4, collar; 401, limit groove; 5, sound wave transmitter; 6, sleeve; 7, sound wave transducer; 8, pile foundation; 9, cross bracket; 901, sealing cover.

DETAILED DESCRIPTION OF THE EMBODIMENTS

Figure 1:
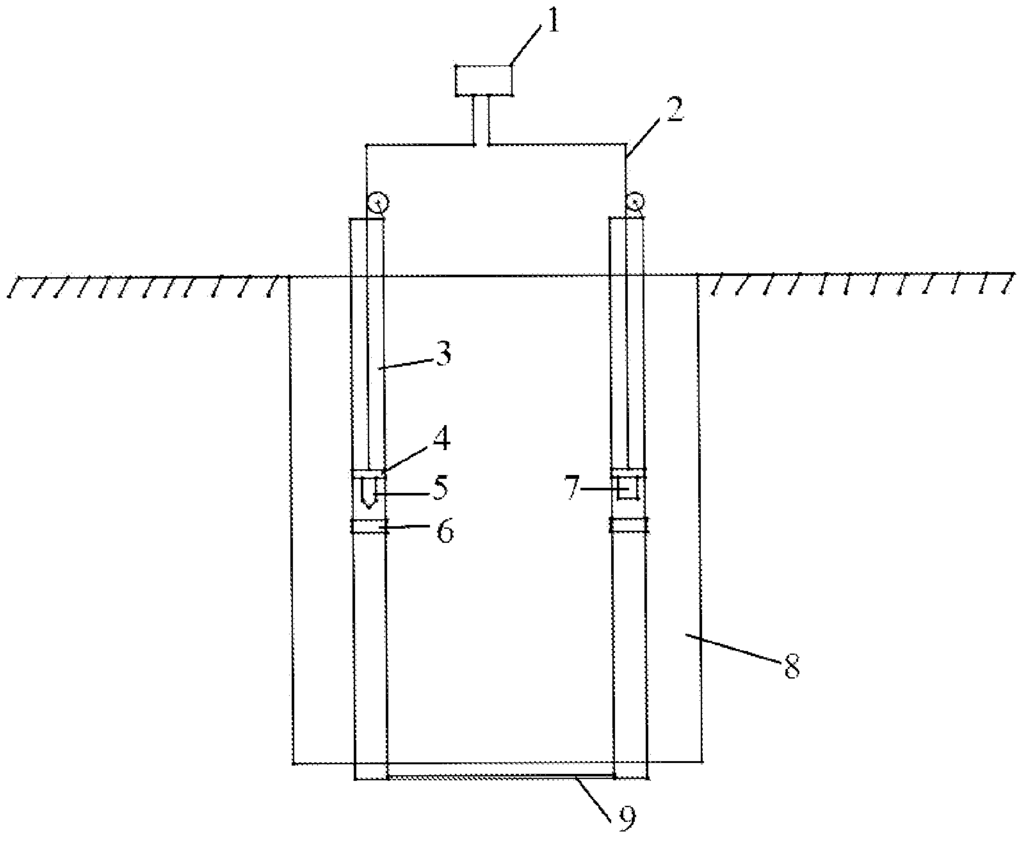
FIG. 1 is a schematic diagram of an overall structure of the present disclosure.
Figure 2:
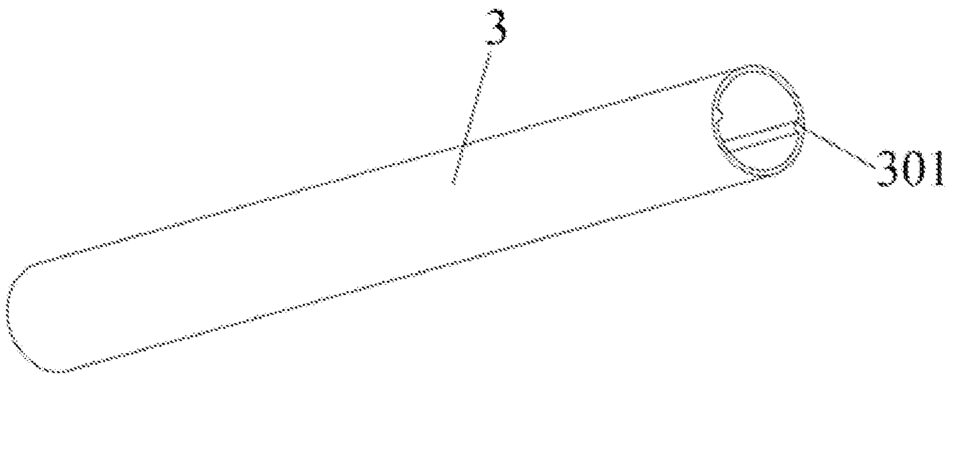
FIG. 2 is a perspective view of a sound detection pipe.
Figure 3:
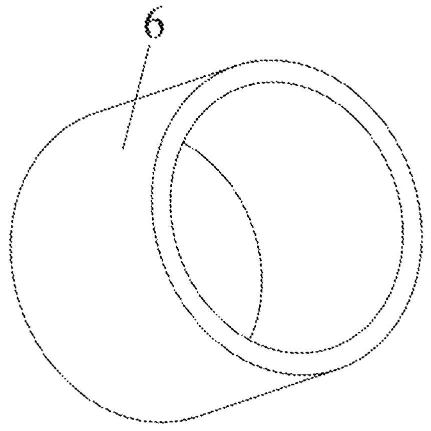
FIG. 3 is a perspective view of a sleeve.

As shown in FIGS. 1-8, a detection device for detecting a quality of ultra-long pile foundation of deep foundation pit support structure includes a plurality of sound detection pipes 3 which are parallel to each other and are vertically arranged on a reinforcement cage of a pile foundation 8. In the present embodiment, the number of the sound detection pipes 3 is four, and each sound detection pipe 3 can be formed by sequentially connecting a plurality of sound detection pipe sections, and a joint between adjacent sound detection pipe sections is wrapped and fixed by a sleeve 6 as shown in FIG. 3.

Figure 7:
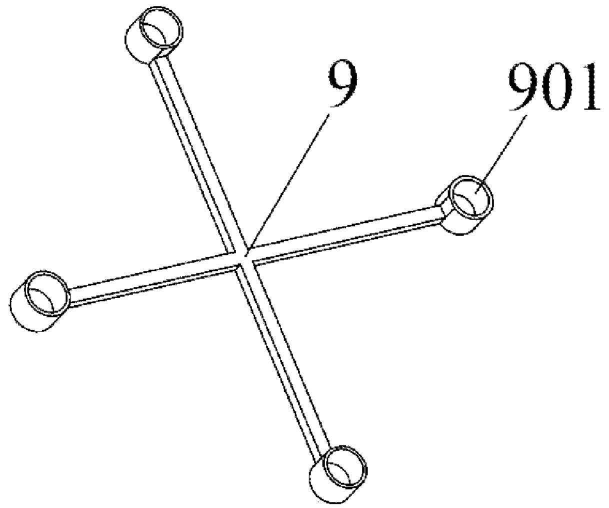
FIG. 7 is a perspective view of a cross bracket.
Figure 8:
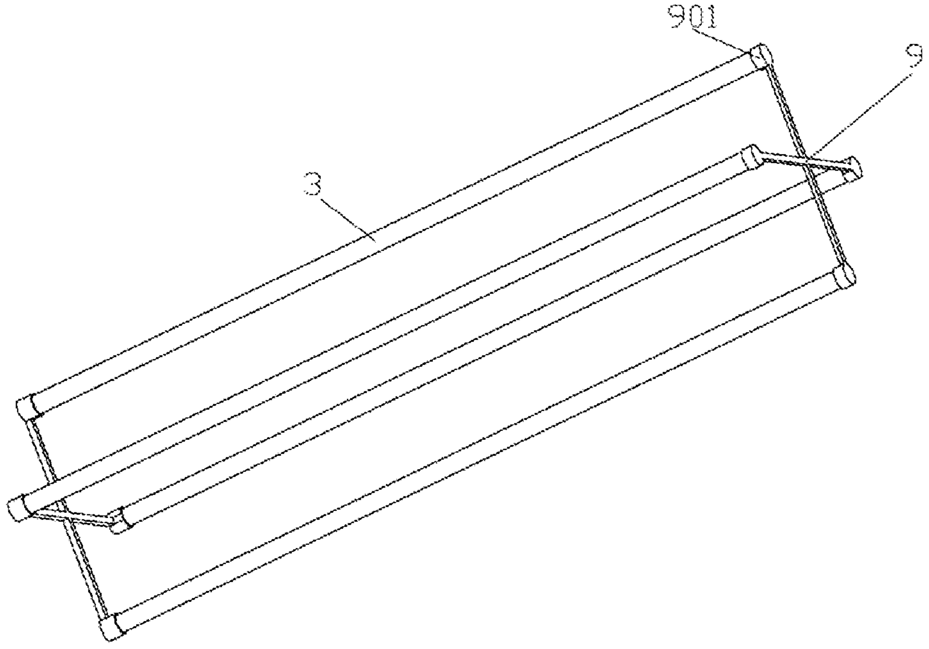
FIG. 8 is a perspective view of cross brackets connected with the sound detection pipe.

The four sound detection pipes 3 are paired, two sound detection pipes 3 in each pair of four sound detection pipes 3 are arranged opposite to each other, and ends of the four sound detection pipes 3 are connected to each other through connecting brackets. As shown in FIGS. 7 and 8, the connecting bracket in the present embodiment is specifically set as a cross bracket 9, and the cross bracket 9 is provided with four sealing covers 901 which sleeve the ends of the sound detection pipes 3.

A sound wave transmitter 5 and a sound wave transducer 7 are respectively arranged in the two sound detection pipes 3 arranged opposite to each other, and are connected with the sound wave detector 1 arranged outside the pile foundation 8 through cables 2.

Figure 4:
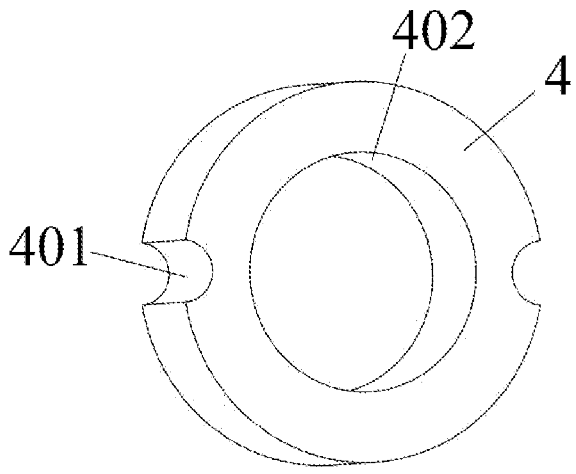
FIG. 4 is a perspective view of a collar.
Figure 5:
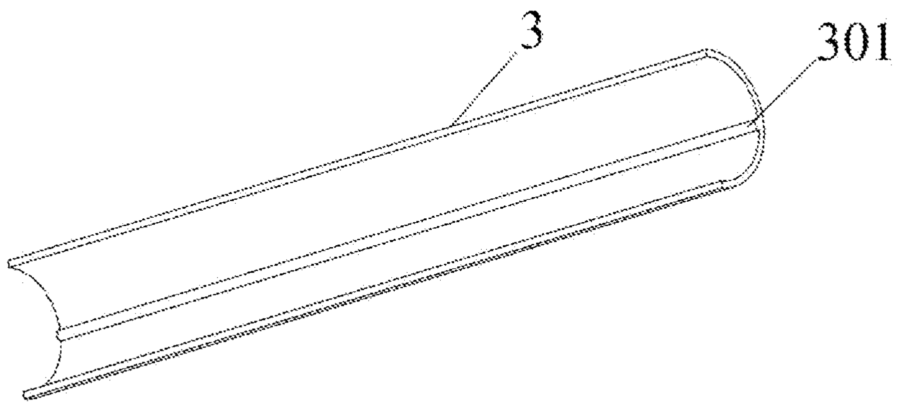
FIG. 5 is a sectional perspective view of the sound detection pipe.
Figure 6:
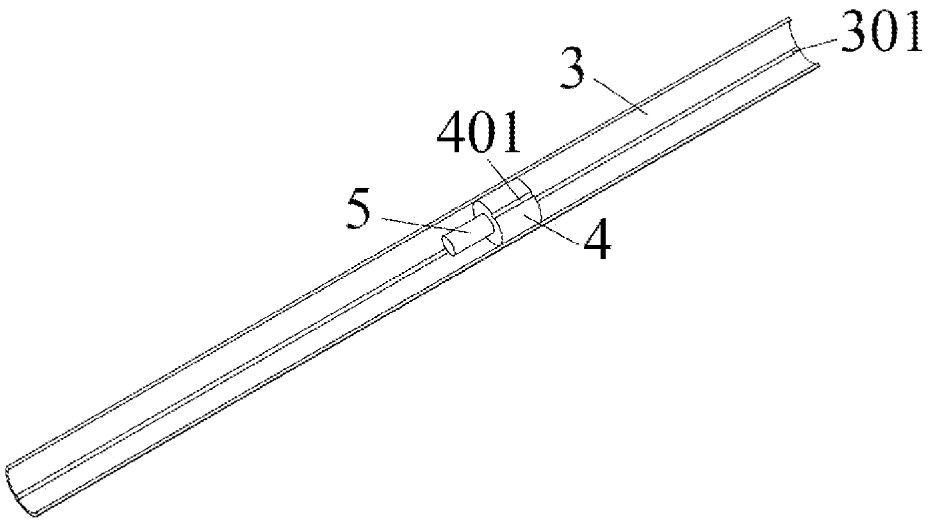
FIG. 6 is a sectional perspective view of a sound wave transmitter being in the sound detection pipe.

In addition, as shown in FIGS. 4-6, the sound wave transmitter 5 and the sound wave transducer 7 respectively, each are sleeved by a collar which is in sliding fit with inner walls of the corresponding sound detection pipes 3. Two limit sliding protrusions 301 are symmetrically formed on the inner wall of each sound detection pipe 3, and two limit grooves 401 which are respectively matched with the two limit sliding protrusions 301 are symmetrically formed on an outer wall of a corresponding collar 4.

In addition, that present disclosure also discloses a method for detecting a quality of ultra-long pile foundation of deep foundation pit support structure, applied to the above detection device and including the following steps:

S1, before construction, a construction site of a pile foundation is cleaned, the construction site of the pile foundation is leveled, the construction site of the pile foundation is compacted, and the construction site is allocated to scientifically plan a mud pit, a reinforcement cage and a storage area of construction machinery in detail.

S2, a pile position with a total station is laid out, a steel liner which should meet requirements of rigidity and strength is then buried, an outside of the steel liner is filled with clay and the clay is compacted, where a top of the steel liner is 0.5 m higher than a ground.

S3, holes are drilled on the ground using a drilling rig, and when a depth of each drilled hole reaches a designed hole depth, a hole position, a hole diameter, a hole depth and an inclination of the drilled hole are measured to ensure that specification requirements are met, and then cleaning the holes;

S4, the reinforcement cage is manufactured, and four sound detection pipes are placed in the reinforcement cage, where distances between adjacent sound detection pipes of the four sound detection pipes are equal.

When the sound detection pipes are placed, it is required that the sound detection pipes are arranged adjacent to and tangent to corresponding vertical steel bars of the reinforcement cage, and each sound detection pipes are connected to adjacent steel bars with steel hoops at intervals of 1 meter along the length direction of the sound detection pipe.

In the step S4, the number of sound detection pipes is determined according to a pile diameter. When the pile diameter is less than or equal to 800 mm, the number of sound detection pipes is no less than two. When the pile diameter is between 800 mm and 1600 mm, the number of sound detection pipes is no less than three. When the pile diameter is greater than 1600 mm, the number of sound detection pipes is no less than four. When the pile diameter is greater than 2500 mm, the number of sound detection pipes is appropriately increased.

S5, the reinforcement cage is lowered into the pre-dug pile foundation, and during the lowering of the reinforcement cage the reinforcement cage is maintained in a vertical state to avoid the reinforcement cage from tilting. Specifically, after the sound detection pipes are placed, bottom openings of all sound detection pipes are sealed by a plurality of sealing covers of the cross bracket; and after the reinforcement cage is lowered, filling all the sound detection pipes with water, and sealing top openings of the four sound detection pipes are sealed by sealing covers of the connecting brackets.

S6, a concrete is poured and solidified.

S7, after the concrete is solidified for a few days, the sound wave detector is erected outside the pile foundation, a sound wave transmitter and sound wave transducer are placed in the pre-arranged sound detection pipes to start a detection, and an integrity of a pile body is determined according to parameters of a received sound waves.

In the present embodiment, the solidification time of the concrete is 28 days. Before starting the detection, it is necessary to remove the connecting brackets at the bottom of a plurality of sound detection pipes. The sound wave detector is placed outside the pile foundation, and then the sound wave transmitter 5, the sound wave transducer 7 and the sound wave detector 1 are debugged. The sound wave transmitter and the sound wave transducer are placed in the pre-arranged sound detection pipes. Specifically, the collars 4 of FIG. 4 sleeve the tops of the sound wave transmitter 5 and the sound wave transducer 7, and there are two limit grooves 401 symmetrical about the center of each collar 4. An outer peripheral wall of the collar 4 of FIG. 4 is in sliding fit with an inner peripheral wall of the corresponding sound detection pipe, and the limit grooves of the collar 4 of FIG. 4 are in fit with the limit sliding protrusions 301 of the corresponding sound detection pipe 3, so that the sound wave transmitter 5 and the sound wave transducer 7 can move vertically in the sound detection pipes 3 along the axial direction of the sound detection pipes 3. The cross-sectional view of the sound wave transmitter in the sound detection pipe is shown in FIG. 6, and the same applies to the sound wave transducer. The sound wave transmitter 5 is connected to the sound wave detector 1 through a corresponding cable 2, and the sound transducer 7 is connected to the sound wave detector 1 through a corresponding cable 2. The sound wave transmitter 5 and the sound wave transducer 7 is putted into the sound detection pipe 3 in the above manner, and the heights of the sound wave transmitter 5 and the sound wave transducer 7 are controlled by stretching the cables 2, to detect the concrete between the sound wave transmitter 5 and the sound wave transducer 7. After the detection, the integrity of the pile body is determined according to the received sound parameter.

The above-mentioned embodiments only describe the preferred implementation of the present disclosure, and do not limit the scope of the present disclosure. Under the premise of not departing from the design spirit of the present disclosure, various modifications and improvements made by ordinary technicians in the field to the technical scheme of the present disclosure shall fall within the protection scope determined by the claims of the present disclosure.

What is claimed is:

1. A detection device for detecting a quality of ultra-long pile foundation of deep foundation pit support structure, comprising: a plurality of sound detection pipes which are arranged opposite each other in pairs and are vertically arranged on a reinforcement cage of a pile foundation, wherein every two sound detection pipes in pair of the plurality of sound detection pipes are arranged opposite to each other, and ends of the plurality of sound detection pipes are connected to each other through connecting brackets; and a sound wave transmitter and a sound wave transducer are respectively arranged in the two sound detection pipes arranged opposite to each other and are connected with a sound wave detector arranged outside the pile foundation through cables;

wherein the connecting brackets each are provided with a plurality of sealing covers which are matched with ends of the sound detection pipes.

2. The detection device for detecting a quality of ultra-long pile foundation of deep foundation pit support structure according to claim 1, wherein each sound detection pipe is formed by sequentially connecting a plurality of sound detection pipe sections, and a joint between adjacent sound detection pipe sections is wrapped and fixed by a sleeve.

3. The detection device for detecting a quality of ultra-long pile foundation of deep foundation pit support structure according to claim 1, wherein the sound wave transmitter and the sound wave transducer each are sleeved by a collar which is in sliding fit with an inner wall of a corresponding sound detection pipe.

4. The detection device for detecting a quality of ultra-long pile foundation of deep foundation pit support structure according to claim 3, wherein two limit sliding protrusions are symmetrically formed on the inner wall of each sound detection pipe, and two limit grooves which are respectively matched with the two limit sliding protrusions are symmetrically formed on an outer wall of a corresponding collar.

5. A method for detecting a quality of ultra-long pile foundation of deep foundation pit support structure, adopting the detection device for detecting a quality of ultra-long pile foundation of deep foundation pit support structure according to claim 1, comprising:

S1, before construction, cleaning a construction site of a pile foundation, leveling the construction site of the pile foundation, compacting the construction site of the pile foundation, and allocating the construction site to scientifically plan a mud pit, a reinforcement cage and a storage area of construction machinery in detail;

S2, laying out a pile position with a total station, then burying a steel liner which meets requirements of rigidity and strength, filling an outside of the steel liner with clay and compacting the clay;

S3, drilling, using a drilling rig, holes on the ground, and when a depth of each drilled hole reaches a designed hole depth, a hole position, a hole diameter, a hole depth and an inclination of the drilled hole are measured to ensure that specification requirements are met, and then cleaning the holes;

S4, manufacturing the reinforcement cage, and placing four sound detection pipes in the reinforcement cage, wherein distances between adjacent sound detection pipes of the four sound detection pipes are equal;

S5, lowering the reinforcement cage into the pre-dug pile foundation, and during the lowering of the reinforcement cage the reinforcement cage is maintained in a vertical state to avoid the reinforcement cage from tilting;

S6, pouring a concrete and waiting for the concrete to solidify; and

S7, after the concrete is solidified for a plurality of days, erecting the sound wave detector outside the pile foundation, placing the sound wave transmitter and the sound wave transducer in pre-placed sound detection pipes to start a detection, and determining an integrity of a pile body according to parameters of received sound waves.

6. The detection method for detecting a quality of ultra-long pile foundation of deep foundation pit support structure according to claim 5, wherein in the step S4, when placing the four sound detection pipes, the four sound detection pipes are arranged adjacent to and tangent to corresponding vertical steel bars of the reinforcement cage, and the four sound detection pipes are connected to the corresponding vertical steel bars by steel hoops at intervals of 1 meter along a length direction of each sound detection pipe.

7. The detection method for detecting a quality of ultra-long pile foundation of deep foundation pit support structure according to claim 5, wherein in the step S5, after the four sound detection pipes are placed, bottom openings of the four sound detection pipes are sealed by a plurality of sealing covers of a cross bracket; then lowering the reinforcement cage into the pre-dug pile foundation, wherein when the placing reinforcement cage, it is necessary to pay attention to maintaining the reinforcement cage in a vertical state to avoid the reinforcement cage from tilting; then filling all the sound detection pipes with water, and sealing top openings of the four sound detection pipes are sealed by sealing covers of the connecting brackets.

8. The detection method for detecting a quality of ultra-long pile foundation of deep foundation pit support structure according to claim 5, wherein in the step S4, a number of sound detection pipes is determined according to a pile diameter, when the pile diameter is less than or equal to 800 mm, the number of sound detection pipes is no less than two; when the pile diameter is between 800 mm and 1600 mm, the number of sound detection pipes is no less than three; and when the pile diameter is greater than 1600 mm, the number of sound detection pipes is no less than four.

9. The detection method for detecting a quality of ultra-long pile foundation of deep foundation pit support structure according to claim 5, wherein in the step S7, before starting the detection, the connecting brackets at the tops of a plurality of sound detection pipes are removed.

10. A method for detecting a quality of ultra-long pile foundation of deep foundation pit support structure, adopting the detection device for detecting a quality of ultra-long pile foundation of deep foundation pit support structure according to claim 2, comprising:

S1, before construction, cleaning a construction site of a pile foundation, leveling the construction site of the pile foundation, compacting the construction site of the pile foundation, and allocating the construction site to scientifically plan a mud pit, a reinforcement cage and a storage area of construction machinery in detail;

S2, laying out a pile position with a total station, then burying a steel liner which meets requirements of rigidity and strength, filling an outside of the steel liner with clay and compacting the clay;

S3, drilling, using a drilling rig, holes on the ground, and when a depth of each drilled hole reaches a designed hole depth, a hole position, a hole diameter, a hole depth and an inclination of the drilled hole are measured to ensure that specification requirements are met, and then cleaning the holes;

S4, manufacturing the reinforcement cage, and placing four sound detection pipes in the reinforcement cage, wherein distances between adjacent sound detection pipes of the four sound detection pipes are equal;

S5, lowering the reinforcement cage into the pre-dug pile foundation, and during the lowering of the reinforcement cage the reinforcement cage is maintained in a vertical state to avoid the reinforcement cage from tilting;

S6, pouring a concrete and waiting for the concrete to solidify; and

S7, after the concrete is solidified for a plurality of days, erecting the sound wave detector outside the pile foundation, placing the sound wave transmitter and the sound wave transducer in pre-placed sound detection pipes to start a detection, and determining an integrity of a pile body according to parameters of received sound waves.

11. The detection method for detecting a quality of ultra-long pile foundation of deep foundation pit support structure according to claim 10, wherein in the step S4, when placing the four sound detection pipes, the four sound detection pipes are arranged adjacent to and tangent to corresponding vertical steel bars of the reinforcement cage, and the four sound detection pipes are connected to the corresponding vertical steel bars by steel hoops at intervals of 1 meter along a length direction of each sound detection pipe.

12. The detection method for detecting a quality of ultra-long pile foundation of deep foundation pit support structure according to claim 10, wherein in the step S5, after the four sound detection pipes are placed, bottom openings of the four sound detection pipes are sealed by a plurality of sealing covers of a cross bracket; then lowering the reinforcement cage into the pre-dug pile foundation, wherein when the placing reinforcement cage, it is necessary to pay attention to maintaining the reinforcement cage in a vertical state to avoid the reinforcement cage from tilting; then filling all the sound detection pipes with water, and sealing top openings of the four sound detection pipes are sealed by sealing covers of the connecting brackets.

13. The detection method for detecting a quality of ultra-long pile foundation of deep foundation pit support structure according to claim 10, wherein in the step S4, a number of sound detection pipes is determined according to a pile diameter, when the pile diameter is less than or equal to 800 mm, the number of sound detection pipes is no less than two; when the pile diameter is between 800 mm and 1600 mm, the number of sound detection pipes is no less than three; and when the pile diameter is greater than 1600 mm, the number of sound detection pipes is no less than four.

14. The detection method for detecting a quality of ultra-long pile foundation of deep foundation pit support structure according to claim 10, wherein in the step S7, before starting the detection, the connecting brackets at the tops of a plurality of sound detection pipes are removed.

* * * * *